United States Patent
Kim et al.

(10) Patent No.: US 12,485,721 B2
(45) Date of Patent: Dec. 2, 2025

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Tae Hee Kim, Ansan-si (KR); Yong Woong Cha, Yongin-si (KR); Wan Je Cho, Hwaseong-si (KR); Seong-Bin Jeong, Seongnam-si (KR); Hyunsub Lee, Hwaseong-si (KR); Hyunjae Lee, Yongin-si (KR); Minseob Shin, Daejeon (KR); Doyoung Kim, Seoul (KR); Chunkyu Kwon, Hwaseong-si (KR); Jae-Eun Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 89 days.

(21) Appl. No.: 18/615,973

(22) Filed: Mar. 25, 2024

(65) Prior Publication Data
US 2025/0128569 A1    Apr. 24, 2025

(30) Foreign Application Priority Data
Oct. 24, 2023  (KR) .................. 10-2023-0142742

(51) Int. Cl.
*B60H 1/00* (2006.01)
*B60H 1/32* (2006.01)

(52) U.S. Cl.
CPC ..... *B60H 1/00278* (2013.01); *B60H 1/00485* (2013.01); *B60H 1/00914* (2013.01); *B60H 1/00921* (2013.01); *B60H 1/32284* (2019.05); *B60H 1/0005* (2013.01); *B60H 2001/00307* (2013.01); *B60H 2001/00949* (2013.01)

(58) Field of Classification Search
CPC ............ B60H 1/00271; B60H 1/00278; B60H 1/00899; B60H 1/00914; B60H 1/00921
See application file for complete search history.

(56) References Cited

U.S. PATENT DOCUMENTS

| | | | | |
|---|---|---|---|---|
| 6,834,511 | B2 * | 12/2004 | Hatakeyama | B60H 1/00849 62/159 |
| 7,003,975 | B2 * | 2/2006 | Feuerecker | F25B 41/24 62/278 |
| 9,786,964 | B2 * | 10/2017 | Takeuchi | B60L 1/02 |
| 10,118,458 | B2 * | 11/2018 | Kim | B60K 1/04 |

(Continued)

*Primary Examiner* — Christopher R Zerphey
(74) *Attorney, Agent, or Firm* — Lempia Summerfield Katz LLC (57) ABSTRACT

In order to efficiently perform heating of a vehicle interior in a state in which the external temperature is low and heat generated by a heating element is not sufficient in an early stage of driving the vehicle, a heat pump system for a vehicle is provided. The heat pump system utilizes various heat sources in a general heating mode of the vehicle interior, and at the same time, maximizes the system performance by increasing flow of the refrigerant. The heat pump system may include: a compressor, a heating, ventilating, and air conditioning (HVAC) module; a heat-exchanger; a first expansion valve; a first connection line; a chiller; a second expansion valve; a second connection line; a third connection line; and a fourth connection line.

20 Claims, 5 Drawing Sheets

(56) References Cited

U.S. PATENT DOCUMENTS

| | | | | |
|---|---|---|---|---|
| 10,137,763 | B2* | 11/2018 | Nakagawa | F25B 43/00 |
| 10,737,552 | B2* | 8/2020 | He | F25B 41/20 |
| 11,179,999 | B2* | 11/2021 | Mieda | B60H 1/00921 |
| 11,479,076 | B2* | 10/2022 | Kim | B60H 1/143 |
| 11,505,034 | B2* | 11/2022 | Kim | B60H 1/00278 |
| 12,325,282 | B2* | 6/2025 | Kim | B60H 1/00278 |
| 12,337,656 | B2* | 6/2025 | Suzuki | B60H 1/00278 |
| 2025/0074148 | A1* | 3/2025 | Jeong | B60H 1/00921 |
| 2025/0115093 | A1* | 4/2025 | Kim | B60H 3/024 |
| 2025/0178415 | A1* | 6/2025 | Jeong | B60H 1/00907 |

* cited by examiner

FIG. 5

HEAT PUMP SYSTEM FOR A VEHICLE

CROSS-REFERENCE TO RELATED APPLICATION

This application claims priority to and the benefit of Korean Patent Application No. 10-2023-0142742 filed on Oct. 24, 2023, the entire contents of which are incorporated herein by reference.

BACKGROUND

(a) Field

The present disclosure relates to a heat pump system for a vehicle. More particularly, the present disclosure relates to a heat pump system for a vehicle capable of efficiently performing heating of a vehicle interior.

(b) Description of the Related Art

Generally, an air conditioning system for a vehicle includes an air conditioner unit circulating a refrigerant in order to heat or cool an interior of the vehicle.

The air conditioner unit is used to maintain the interior of the vehicle at an appropriate temperature regardless of a change in an external temperature. The air conditioning unit is configured to heat or cool the interior of the vehicle. This is achieved by exchanging heat using a condenser and an evaporator in a process in which a refrigerant discharged by driving a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

In accordance with a continuous increase in interest in energy efficiency and environmental pollution, the development of an environmentally-friendly vehicle capable of substantially substituting for an internal combustion engine vehicle is desired. The environmentally-friendly vehicle is classified into an electric vehicle driven using a fuel cell or electricity as a power source and a hybrid vehicle driven using an engine and a battery.

An air conditioning apparatus applied to such an environment-friendly vehicle is typically referred to as a heat pump system.

The electric vehicle driven by a power source of a fuel cell generates driving force by converting chemical reaction energy between oxygen and hydrogen into electrical energy. In this process, heat energy is generated by a chemical reaction in a fuel cell. Therefore, it is desired to secure the performance of the fuel cell to effectively remove generated heat.

In addition, a hybrid vehicle generates driving force by driving a motor using electricity supplied from the fuel cell described above or an electrical battery, together with an engine powered by general fuel. Therefore, heat generated from the fuel cell or the battery, and the motor should be effectively removed in order to secure performance of the motor.

Therefore, in the hybrid vehicle or the electric vehicle according to the related art, a cooling means, a heat pump system, and a battery cooling system, respectively, are configured as separate closed circuits so as to prevent heat generation from the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes is employed. Thus, noise and vibration due to the frequent opening and closing operations of the valves may be introduced into the vehicle interior, thereby deteriorating the ride comfort.

In addition, when heating the vehicle interior, the heating performance deteriorated due to the lack of a heat source. The electricity consumption may be increased due to the usage of the electric heater, and the power consumption of the compressor may be increased.

The above information disclosed in this Background section is only to enhance understanding of the background of the disclosure. Therefore, the Background section may contain information that does not form the prior art that is already known to a person of ordinary skill in the art.

SUMMARY

The present disclosure provides a heat pump system for a vehicle capable of efficiently performing heating of a vehicle interior in a state in which the external temperature is low and heat generated by a heating element is not sufficient in an early stage of driving the vehicle. This is achieved by utilizing various heat sources in a general heating mode of the vehicle interior, and at the same time, maximizing the system performance by increasing the flow of the refrigerant.

In an embodiment of the present disclosure, a heat pump system for a vehicle may include a compressor configured to compress a refrigerant circulating the heat pump system. The heat pump system may also include a heating, ventilation, and air conditioning (HVAC) module including an internal condenser, and an evaporator connected to the compressor via a refrigerant line. The HVAC module may further include an opening/closing door configured to adjust air having passed through the evaporator to be selectively introduced into the internal condenser depending on a cooling mode or a heating mode of the vehicle. The heat pump system may also include: a heat-exchanger connected to the internal condenser via the refrigerant line; a first expansion valve provided in the refrigerant line between the heat-exchanger and the evaporator; and a first connection line. The first connection line has a first end connected to the refrigerant line between the heat-exchanger and the first expansion valve, and a second end connected to the refrigerant line between the evaporator and the compressor. The heat pump system may also include a chiller provided in the first connection line, and configured to adjust a temperature of a coolant by exchanging heat between the refrigerant introduced into the first connection line and a selectively introduced coolant. The heat pump system may also include: a second expansion valve provided in the first connection line upstream of the chiller; a second connection line having a first end connected to the refrigerant line between the compressor and the internal condenser, and a second end connected to a third expansion valve; a third connection line having a first end connected to the third expansion valve, and a second end connected to the refrigerant line between the chiller and the compressor; and a fourth connection line. The fourth connection line has a first end connected to the third expansion valve, and a second end connected to the refrigerant line between the heat-exchanger and the first expansion valve.

A heat pump system for a vehicle may further include: a fourth expansion valve provided in the refrigerant line between the internal condenser and the heat-exchanger; and a fifth connection line having a first end connected to the refrigerant line between the internal condenser and the fourth expansion valve, and a second end connected to the second expansion valve. The heat pump system may further include a sixth connection line having a first end connected to the fourth expansion valve, and a second end connected to the refrigerant line between the first expansion valve and the evaporator.

In a hot gas heating mode of a vehicle interior, the refrigerant line connecting the heat-exchanger and the first expansion valve, the refrigerant line connecting the first expansion valve and the evaporator, and the refrigerant line connecting the evaporator and the compressor may be closed by an operation of the first expansion valve. The refrigerant line connecting the heat-exchanger and the fourth expansion valve may be closed by an operation of the fourth expansion valve. A partial first connection line connecting the refrigerant line between the heat-exchanger and the first expansion valve and the second expansion valve may be closed. A partial first connection line connecting the refrigerant line between the evaporator and the compressor and the chiller may be opened. The second connection line and the third connection line may be opened by an operation of the third expansion valve. The fourth connection line may be closed by the operation of the third expansion valve. The fifth connection line may be opened by an operation of the second expansion valve. The sixth connection line may be closed by the operation of the fourth expansion valve.

The second expansion valve may be configured to expand the refrigerant introduced via the fifth connection line and supply the expanded refrigerant to the chiller.

The third expansion valve may expand the refrigerant introduced via the second connection line, and flow the expanded refrigerant to the third connection line.

In the heating mode of a vehicle interior, the refrigerant line connecting the first expansion valve and the evaporator, and the refrigerant line connecting the evaporator and the compressor may be closed by an operation of the first expansion valve. The refrigerant line connecting the heat-exchanger and the fourth connection line may be opened. The refrigerant line connecting the heat-exchanger and the fourth expansion valve may be opened by an operation of the fourth expansion valve. A partial first connection line connecting the refrigerant line between the heat-exchanger and the first expansion valve and the second expansion valve may be closed. A partial first connection line connecting the refrigerant line between the evaporator and the compressor and the chiller may be opened. The second connection line may be closed by an operation of the third expansion valve. The third connection line and the fourth connection line may be opened by the operation of the third expansion valve. The fifth connection line may be opened by an operation of the second expansion valve. The sixth connection line may be closed by the operation of the fourth expansion valve. Additionally, the fourth expansion valve may expand the refrigerant introduced via the refrigerant line, and may flow the expanded refrigerant into the heat-exchanger.

The heat-exchanger may be configured to recollect ambient air heat while evaporating the refrigerant supplied from the fourth expansion valve by exchanging heat with the ambient air.

The second expansion valve may be configured to expand the refrigerant introduced via the fifth connection line and supply the expanded refrigerant to the chiller.

The third expansion valve may be configured to flow the refrigerant introduced via the fourth connection line to the third connection line without expansion.

In a heating and dehumidifying mode of a vehicle interior, the refrigerant line connecting the heat-exchanger and the first expansion valve may be closed by an operation of the first expansion valve. The refrigerant line connecting the heat-exchanger and the fourth expansion valve may be closed by an operation of the fourth expansion valve. The refrigerant line connecting the evaporator and the compressor, and the refrigerant line connecting the second end of the sixth connection line and the evaporator such that the sixth connection line may be connected to the evaporator via the refrigerant line are opened. A partial first connection line connecting the refrigerant line between the heat-exchanger and the first expansion valve and the second expansion valve may be closed. A partial first connection line connecting the refrigerant line between the evaporator and the compressor and the chiller may be opened. The second connection line, the third connection line, and the fourth connection line may be closed by an operation of the third expansion valve. The fifth connection line may be opened by an operation of the second expansion valve. The sixth connection line may be opened by the operation of the fourth expansion valve.

The second expansion valve may be configured to expand the refrigerant introduced via the fifth connection line and supply the expanded refrigerant to the chiller.

The fourth expansion valve may expand the refrigerant introduced via the refrigerant line, and flow the expanded refrigerant to the sixth connection line.

For cooling of a battery module in the cooling mode of a vehicle interior, the refrigerant line may be opened by an operation of the first expansion valve and the fourth expansion valve, so as to form one closed circuit in which the refrigerant circulates. The first connection line may be opened by an operation of the second expansion valve. The second connection line, the third connection line, and the fourth connection line may be closed by an operation of the third expansion valve. The fifth connection line may be closed by the operation of the second expansion valve. The sixth connection line may be closed by the operation of the fourth expansion valve.

The first expansion valve may be configured to expand the refrigerant introduced via the refrigerant line. The second expansion valve may expand the refrigerant introduced via the first connection line. The fourth expansion valve may be configured to flow the refrigerant introduced from the internal condenser via the refrigerant line to the refrigerant line without expansion.

The heat-exchanger may be further configured to condense or evaporate the refrigerant condensed at the internal condenser by exchanging heat with ambient air, according to a selective operation of the fourth expansion valve.

The second expansion valve, the third expansion valve, and the fourth expansion valve may be electronic expansion valves configured to selectively expand the refrigerant while controlling the flow of the refrigerant.

A second end of the fourth connection line may be connected to the refrigerant line between the heat-exchanger and a location where a first end of the first connection line may be connected to the refrigerant line.

The chiller may be disposed in parallel with the heat-exchanger via the first connection line.

A heat pump system for a vehicle may further include an accumulator provided in the refrigerant line between the evaporator and the compressor.

The chiller may be connected between an electrical component and a battery module via a first line and a second line. The first line and the second line each circulate the coolant.

As described above, according to a heat pump system for a vehicle according to an embodiment, heating of a vehicle interior may be efficiently performed even in a state in which the external temperature is low and heat generated by a heating element is not sufficient in an early stage of driving the vehicle.

In addition, according to the present disclosure, by utilizing various heat sources in a general heating mode of the vehicle interior, and at the same time, by increasing the flow amount of the refrigerant by disposing a heat-exchanger and a chiller in parallel, the system performance may be maximized.

In addition, according to the present disclosure, since heating of the vehicle interior may be performed by using a high-temperature refrigerant compressed in a compressor while minimizing the required number of components, an electric heater may not be employed, and streamlining and simplification of the entire system may be achieved.

In addition, according to the present disclosure, when the electric heater is employed, since the usage of the electric heater may be minimized, electricity consumption may be reduced, and an overall travel distance of the vehicle may be increased.

In addition, according to an embodiment, it is possible to reduce manufacturing cost and weight through simplification of an entire system, and to improve space utilization.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

The embodiments of the present disclosure are hereinafter described in detail with reference to the accompanying drawings.

Embodiments disclosed in the present disclosure and the constructions depicted in the drawings are only some of the embodiments of the present disclosure, and do not cover the entire scope of the present disclosure. Therefore, it should be understood that there may be various equivalents and variations at the time of the application of this disclosure.

In order to clarify the present disclosure, parts that are not related to the description have been omitted, and the same elements or equivalents are referred to with the same reference numerals throughout the present disclosure.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the words "comprise" and variations such as "comprises" or "comprising," should be understood to imply the inclusion of stated elements but not the exclusion of any other elements.

Furthermore, each of the terms, such as " . . . unit," " . . . means," " . . . portions," " . . . part," and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

Figure 1:
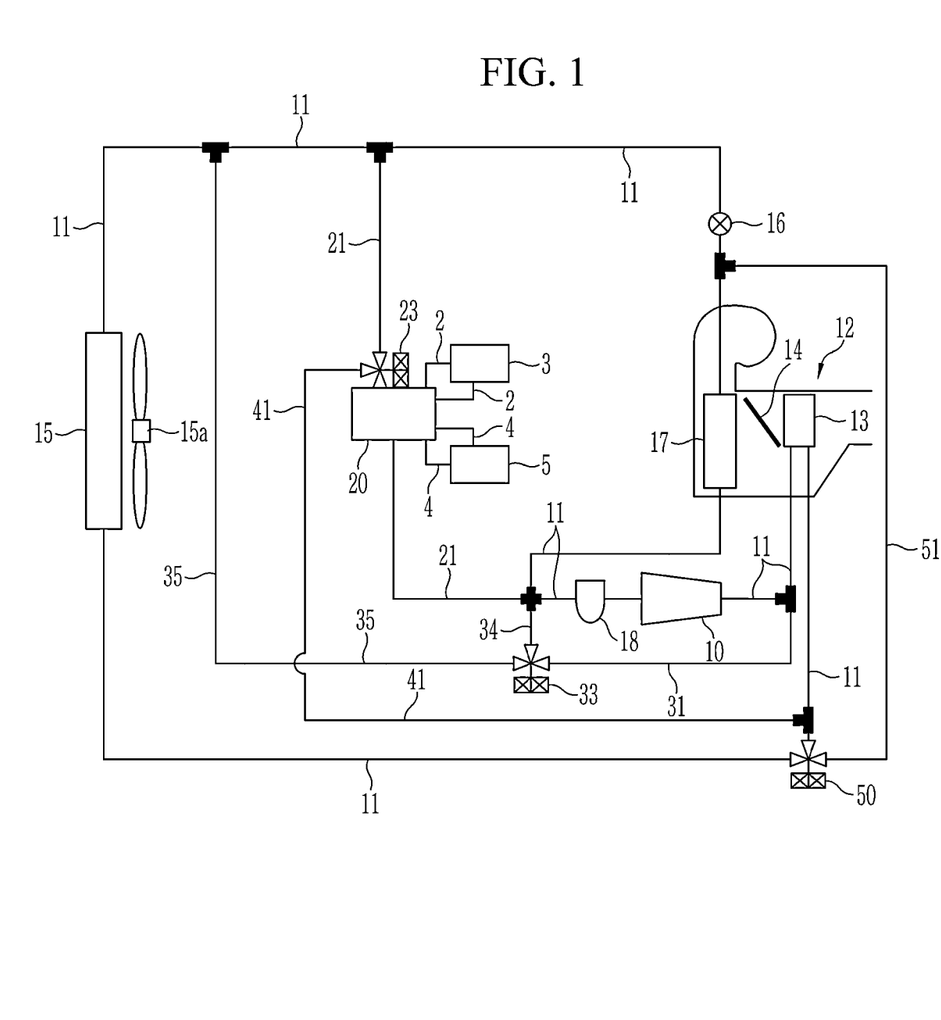
FIG. 1 is a block diagram illustrating a heat pump system for a vehicle according to an embodiment.

FIG. 1 is a block diagram illustrating a heat pump system for a vehicle according to an embodiment.

A heat pump system for a vehicle according to an embodiment may efficiently perform heating of the vehicle interior in a state in which the external temperature is low and heat generated by a heating element is not sufficient in an early stage of driving the vehicle. In addition, in a general heating mode of the vehicle interior, the heat pump system may maximize the system performance by utilizing various heat sources and at the same time increase flow of the refrigerant. The heating element may include an electrical component 3 and a battery module 5.

In other words, referring to FIG. 1, the heat pump system may include: a compressor 10; a heating, ventilation, and air conditioning (HVAC) module 12; a heat-exchanger 15; a first expansion valve 16; an evaporator 17; an accumulator 18; the chiller 20; a first connection line 21; a second expansion valve 23; a second connection line 31; a third connection line 34; and a fourth connection line 35.

First, the compressor 10 may compress the refrigerant introduced into the compressor and flow the compressed refrigerant to the refrigerant line 11 such that the refrigerant may circulate along a refrigerant line 11.

In the present embodiment, an internal condenser 13 and the evaporator 17 that are connected through the refrigerant line 11 may be provided inside the HVAC module 12.

An opening/closing door 14 configured to adjust ambient air having passed through the evaporator 17 to be selectively introduced into the internal condenser 13 may be provided inside the HVAC module 12 between the evaporator 17 and the internal condenser 13.

At the time of heating the vehicle interior, the opening/closing door 14 may be opened such that the ambient air having passed through the evaporator 17 may be introduced into the internal condenser 13.

In other words, the high-temperature refrigerant supplied to the internal condenser 13 may heat the ambient air passing through the internal condenser 13. In other words, since the introduced ambient air is converted to a high-temperature state while passing through the internal condenser 13 and then introduced into the vehicle interior, the heating of the vehicle interior may be realized.

To the contrary, at the time of cooling the vehicle interior, the opening/closing door 14 may close a side toward the internal condenser 13 such that the ambient air cooled while passing through the evaporator 17 may be directly introduced into the vehicle interior.

Accordingly, the ambient air passing through the evaporator 17 may be cooled by the low-temperature refrigerant supplied to the evaporator 17, while passing through the evaporator 17. Since the cooled ambient air is introduced into the vehicle interior, the vehicle interior may be cooled.

In the present embodiment, the heat-exchanger 15 may be connected to the internal condenser 13 through the refrigerant line 11. The heat-exchanger 15 may be disposed in a front portion of the vehicle.

A cooling fan 15a may be provided at a rear of the heat-exchanger 15. Accordingly, the heat-exchanger 15 may exchange heat between the introduced refrigerant with the ambient air introduced by an operation of the cooling fan 15a or by operating the vehicle (i.e., when the vehicle is traveling).

In other words, the heat-exchanger 15 may be an air-cooled heat-exchanger configured to exchange heat between the introduced refrigerant with the ambient air.

The first expansion valve 16 may be provided in the refrigerant line 11 connecting the heat-exchanger 15 and the evaporator 17. The first expansion valve 16 may selectively expand the introduced refrigerant.

The accumulator 18 may be provided in the refrigerant line 11 between the evaporator 17 and the compressor 10. In more detail, the accumulator 18 may be provided in the refrigerant line 11 between a second end of the third connection line 34 and the compressor 10.

The accumulator 18 may supply the gaseous refrigerant to the compressor 10, thereby improving efficiency and durability of the compressor 10.

In the present embodiment, the chiller 20 may be connected to the electrical component 3 through a first line 2 through which a coolant circulates.

The electrical component 3 may include: an electric power control unit (EPCU), a power conversion device such as a motor, an inverter, an on-board charger (OBC), or the like; and an autonomous driving controller or the like.

The electrical component 3 configured as such may be water-cooled by being connected to the first line 2.

The chiller 20 may adjust a temperature of the electrical component 3 by using the coolant heat-exchanged with the refrigerant, and may recollect a waste heat of the electrical component 3.

In addition, the chiller 20 may be connected to the battery module 5 through a second line 4 through which the coolant circulates. Accordingly, the coolant may selectively circulate through an interior of the chiller 20.

The chiller 20 may exchange heat between the refrigerant supplied from an air conditioner unit and the coolant, and thereby adjust the temperature of the coolant. In other words, the chiller 20 may be a water-cooled heat-exchanger that exchanges heat between the interiorly introduced refrigerant and the coolant.

The chiller 20 may be connected to the refrigerant line 11 through the first connection line 21.

A first end of the first connection line 21 may be connected to the refrigerant line 11 between the heat-exchanger 15 and the first expansion valve 16. In addition, a second end of the first connection line 21 may be connected to the refrigerant line 11 between the evaporator 17 and the accumulator 18.

In other words, the chiller 20 may exchange heat between the coolant selectively introduced through the first line 2 or the second line 4 with the refrigerant selectively supplied from the air conditioner unit, to adjust the temperature of the coolant.

Accordingly, the coolant having exchanged heat in the chiller 20 may circulate the electrical component 3 through the first line 2. In addition, the coolant having exchanged heat in the chiller 20 may circulate the battery module 5 through the second line 4.

A water pump (not shown) may be provided in the first line 2 and the second line 4.

In other words, the coolant may circulate the first line 2 and the second line 4 according to an operation of each water pump (not shown).

Accordingly, the coolant having exchanged heat with the refrigerant in the chiller 20 may be selectively supplied to the electrical component 3 and the battery module 5. As a result, the coolant may adjust the temperature of the electrical component 3 and the battery module 5.

The chiller 20 configured as such may be disposed in parallel with the heat-exchanger 15 through the first connection line 21.

In the present embodiment, the second expansion valve 23 may be provided in the first connection line 21 upstream of the chiller 20.

The second expansion valve 23 configured as such may be an electronic expansion valve that selectively expands the refrigerant while controlling the flow of the supplied refrigerant.

The upstream of the chiller 20 may be set based on a flow direction of the refrigerant. Based on a direction in which the refrigerant flows along the first connection line 21, a location from which the refrigerant flows into the chiller 20 may be defined as the upstream of the chiller 20, and a location to which the refrigerant is discharged from the chiller 20 may be defined as downstream (i.e., rear end) of the chiller 20.

In the present embodiment, a first end of the second connection line 31 may be connected to the refrigerant line 11 between the compressor 10 the internal condenser 13. A second end of the second connection line 31 may be connected to a third expansion valve 33.

In the present embodiment, a first end of the third connection line 34 may be connected to the third expansion valve 33. A second end of the third connection line 34 may be connected to the refrigerant line 11 between the chiller 20 and the compressor 10.

In more detail, the second end of the third connection line 34 may be connected to the refrigerant line 11 between the chiller 20 and the accumulator 18.

In addition, a first end of the fourth connection line 35 may be connected to the third expansion valve 33. A second end of the fourth connection line 35 may be connected to the refrigerant line 11 between the heat-exchanger 15 and the first expansion valve 16.

In more detail, the second end of the fourth connection line 35 may be connected to the refrigerant line 11 between the heat-exchanger 15 and a location where the first end of the first connection line 21 is connected to the refrigerant line 11.

The third expansion valve 33 may be a 3-way electronic expansion valve that selectively expands the refrigerant while controlling the flow of the supplied refrigerant.

The heat pump system configured as such may further include a fifth connection line 41, a fourth expansion valve 50, and a sixth connection line 51.

First, the fourth expansion valve 50 may be provided in the refrigerant line 11 between the internal condenser 13 and the heat-exchanger 15.

The fourth expansion valve 50 configured as such may be a 3-way electronic expansion valve that selectively expands the refrigerant while controlling the flow of the supplied refrigerant.

The heat-exchanger 15 may condensate or evaporate the interiorly introduced refrigerant by exchanging heat between the ambient air according to a selective operation of the fourth expansion valve 50.

In other words, when the fourth expansion valve 50 expands the refrigerant and supplies the expanded refrigerant, the heat-exchanger 15 may evaporate the supplied refrigerant.

To the contrary, when the fourth expansion valve 50 supplies the refrigerant without expansion, the heat-exchanger 15 may condense the supplied refrigerant.

In the present embodiment, a first end of the fifth connection line 41 may be connected to the refrigerant line 11 between the internal condenser 13 the fourth expansion valve 50. A second end of the fifth connection line 41 may be connected to the second expansion valve 23.

In addition, a first end of the sixth connection line 51 may be connected to the fourth expansion valve 50. A second end of the sixth connection line 51 may be connected to the refrigerant line 11 between the first expansion valve 16 the evaporator 17.

The sixth connection line 51 configured as such may be selectively opened and closed depending on the operation of the fourth expansion valve 50. For example, when dehumidification is required at the time of heating the vehicle interior, the sixth connection line 51 may be opened by the operation of the fourth expansion valve 50.

An operation and action of a heat pump system according to an embodiment configured as such is described in detail with reference to FIGS. 2-4.

First, the operation of the heat pump system for a vehicle in a hot gas heating mode of the vehicle interior is described with reference to FIG. 2.

Figure 2:
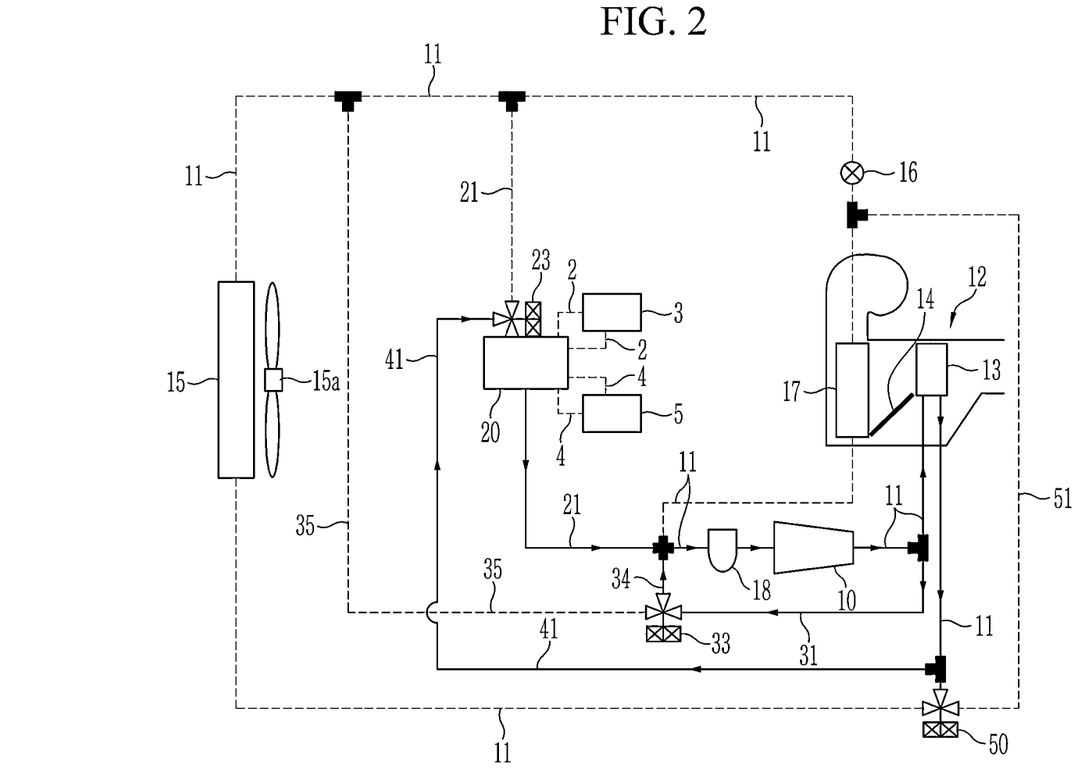
FIG. 2 is an operation diagram illustrating a heat pump system for a vehicle according to an embodiment, in a hot gas heating mode of the vehicle interior.

FIG. 2 is an operation diagram illustrating a heat pump system for a vehicle according to an embodiment, in the hot gas heating mode of the vehicle interior.

Referring to FIG. 2, when the ambient air heat, the waste heat of the electrical component 3, and a waste heat of the battery module 5 are not sufficient, the heat pump system may not recollect the heat.

In other words, when heating of the vehicle interior is required in a state that the external temperature is low and the heat generated from the electrical component and a battery module 4 is not sufficient in the early stage of driving the vehicle, the heat pump system may perform heating of the vehicle interior by directly using the high-pressure and high-temperature refrigerant.

As such, heating the vehicle interior by using only the refrigerant may be referred to as the hot gas heating mode.

In the present embodiment, in the case of the hot gas heating mode of the vehicle interior, the refrigerant line 11 connecting the heat-exchanger 15 and the first expansion valve 16, the refrigerant line 11 connecting the first expansion valve 16 and the evaporator 17, and the refrigerant line 11 connecting the evaporator 17 and the compressor 10 may be closed by an operation of the first expansion valve 16.

Simultaneously, the refrigerant line 11 connecting the heat-exchanger 15 and the fourth expansion valve 50 may be closed by the operation of the fourth expansion valve 50.

A portion of the first connection line 21 connecting the second expansion valve 23 and the refrigerant line 11 between the heat-exchanger 15 and the first expansion valve 16 may be closed.

In addition, a partial first connection line 21 connecting the refrigerant line 11 between the evaporator 17 and the compressor 10 and the chiller 20 may be opened.

The second connection line 31 and the third connection line 34 may be opened by an operation of the third expansion valve 33. In addition, the fourth connection line 35 may be closed by the operation of the third expansion valve 33.

The third expansion valve 33 may expand the refrigerant introduced through the second connection line 31 from the compressor 10, and flow the expanded refrigerant to the third connection line 34.

In the present embodiment, the fifth connection line 41 may be opened by an operation of the second expansion valve 23. The second expansion valve 23 may expand the refrigerant introduced through the fifth connection line 41 and supply the expanded refrigerant to the chiller 20.

In addition, the sixth connection line 51 may be closed by the operation of the fourth expansion valve 50.

In such a state, a partial refrigerant among the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant having passed through the internal condenser 13 may flow into the second expansion valve 23 along the refrigerant line 11 and the fifth connection line 41. The second expansion valve 23 may expand the introduced refrigerant.

The refrigerant expanded in the second expansion valve 23 may flow into the chiller 20. At this time, the first line 2 and the second line 4 may be closed such that the refrigerant and the coolant may not exchange heat in the chiller 20.

In other words, since the heat generated in the electrical component 3 and the battery module 5 is not sufficient, the coolant may not flow into the chiller 20.

The refrigerant having passed through the chiller 20 may flow into the accumulator 18 along the opened first connection line 21 and the refrigerant line 11.

A remaining refrigerant among the refrigerant discharged from the compressor 10 may flow into the third expansion valve 33 along the opened second connection line 31. The third expansion valve 33 may expand the refrigerant.

The refrigerant expanded in the third expansion valve 33 may flow along the third connection line 34, and may flow into the accumulator 18 along the refrigerant line 11 connected to the third connection line 34.

In other words, the refrigerant having passed through the chiller 20 after being expanded by the second expansion valve 23 and the refrigerant expanded in the third expansion valve 33 may flow into the accumulator 18, respectively. The refrigerant introduced into the accumulator 18 may be separated into gas and liquid, and the gaseous refrigerant among the refrigerant separated into gas and liquid may flow into the compressor 10.

The refrigerant introduced into the compressor 10 may be supplied back to the internal condenser 13 and the third expansion valve 33, respectively.

In other words, in the present embodiment, when the heat is not sufficient in the early stage of driving the vehicle in a state that the external temperature is low, while repeatedly performing the above-described operation, the vehicle interior may be heated by using the high-temperature refrigerant supplied from the compressor 10.

In the present embodiment, the operation in the heating mode of the vehicle interior is described with reference to FIG. 3.

Figure 3:
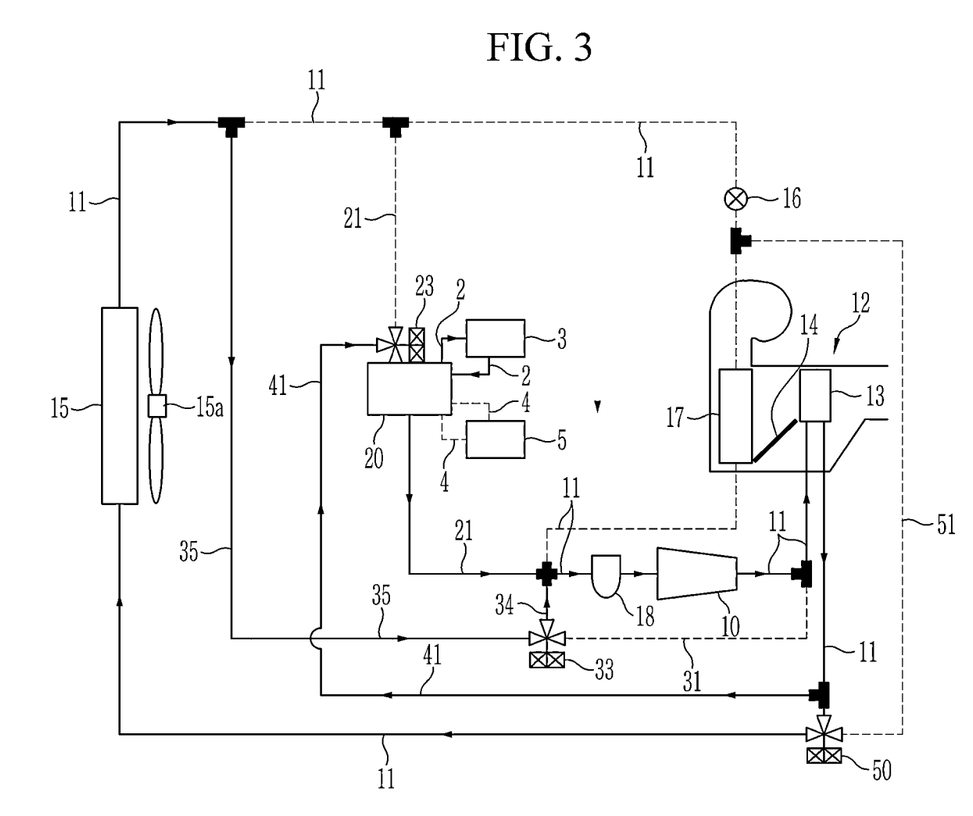
FIG. 3 is an operation diagram illustrating a heat pump system for a vehicle according to an embodiment, in a heating mode of the vehicle interior.

FIG. 3 is an operation diagram illustrating a heat pump system for a vehicle according to an embodiment, in the heating mode of the vehicle interior.

Referring to FIG. 3, in the heating mode of the vehicle interior, the heat pump system may recollect the ambient air heat and the waste heat of the electrical component 3.

In the present embodiment, in the case of the heating mode of the vehicle interior, the refrigerant line 11 connecting the first expansion valve 16 and the evaporator 17 may be closed by the operation of the first expansion valve 16.

In addition, the refrigerant line 11 connecting the evaporator 17 and the compressor 10 may be closed by the operation of the first expansion valve 16.

Simultaneously, the refrigerant line 11 connecting the heat-exchanger 15 and the fourth connection line 35 may be opened. In addition, the refrigerant line 11 connecting the heat-exchanger 15 and the fourth expansion valve 50 may be opened by the operation of the fourth expansion valve 50.

A portion of the first connection line 21 connecting the second expansion valve 23 and the refrigerant line 11 between the heat-exchanger 15 and the first expansion valve 16 may be closed.

In addition, a partial first connection line 21 connecting the refrigerant line 11 between the evaporator 17 and the compressor 10 and the chiller 20 may be opened.

In addition, the second connection line 31 may be closed by the operation of the third expansion valve 33.

Simultaneously, the third connection line 34 and the fourth connection line 35 may be opened by the operation of the third expansion valve 33. The third expansion valve 33 may flow the refrigerant introduced through the fourth connection line 35 to the third connection line 34 without expansion.

In the present embodiment, the fifth connection line 41 may be opened by the operation of the second expansion valve 23. The second expansion valve 23 may expand the refrigerant introduced through the fifth connection line 41 and supply the expanded refrigerant to the chiller 20.

In addition, the sixth connection line 51 may be closed by the operation of the fourth expansion valve 50.

In such a state, when the compressor 10 is operated to heat the vehicle interior, the refrigerant discharged from the compressor 10 may flow into the internal condenser 13 along the refrigerant line 11.

The opening/closing door 14 may be opened such that the ambient air introduced into the HVAC module 12 may pass through the internal condenser 13.

Accordingly, when passing through the evaporator 17 that is not supplied with the refrigerant, the ambient air introduced from the outside may be introduced into the evaporator 17 at a room temperature state without being cooled. Since the introduced ambient air is converted to a high-temperature state while passing through the internal condenser 13 and then introduced into the vehicle interior, the heating of the vehicle interior may be realized.

The refrigerant discharged from the internal condenser 13 may flow along the refrigerant line 11. A partial refrigerant among the refrigerant flowing along the refrigerant line 11 may flow into the second expansion valve 23 along the opened fifth connection line 41.

The second expansion valve 23 may expand the refrigerant introduced through the fifth connection line 41 and supply the expanded refrigerant to the chiller 20.

The coolant may circulate through the first line 2 by an operation of a water pump (not shown). Accordingly, the coolant having passed through the electrical component 3 may be supplied to the chiller 20 along the first line 2.

In other words, the coolant having an increased temperature by absorbing the waste heat from the electrical component 3 may be supplied to the chiller 20 through the coolant line 2.

The chiller 20 may evaporate the expanded refrigerant by exchanging heat with the coolant supplied through the first line 2. The chiller 20 may recollect the waste heat of the electrical component 3 from the coolant heated by recollecting waste heat from the electrical component 3.

A remaining refrigerant among the refrigerant flowing along the refrigerant line 11 may flow into the fourth expansion valve 50.

The fourth expansion valve 50 may expand the refrigerant introduced through the refrigerant line 11, and may flow the expanded refrigerant to the heat-exchanger 15 connected through the refrigerant line 11.

Accordingly, the heat-exchanger 15 may recollect the ambient air heat while evaporating the refrigerant supplied from the fourth expansion valve 50 by exchanging heat with the ambient air.

The refrigerant having passed through the heat-exchanger 15 may flow to the third expansion valve 33 along the refrigerant line 11 and the fourth connection line 35. The third expansion valve 33 may flow the refrigerant introduced through the fourth connection line 35 to the third connection line 34 without expansion.

The refrigerant discharged from the chiller 20 may flow along the first connection line 21, and may flow to the accumulator 18 together with the refrigerant flowing along the third connection line 34.

In addition, the refrigerant having passed through the accumulator 18 may repeatedly perform the above-described processes while being supplied to the compressor 10.

In other words, when heating of the vehicle interior is required, the heat pump system according to the present embodiment may absorb the ambient air heat from the heat-exchanger 15, and increase the temperature of the refrigerant by using the waste heat of the electrical component 3. As a result, the heat pump system reduces the power consumption of the compressor 10 and improves the heating efficiency.

In addition, according to the present disclosure, the heating efficiency and performance may be improved while minimizing usage of a separate electric heater.

In addition, in the present embodiment, the operation in a heating and dehumidifying mode of the vehicle interior is described with reference to FIG. 4.

Figure 4:
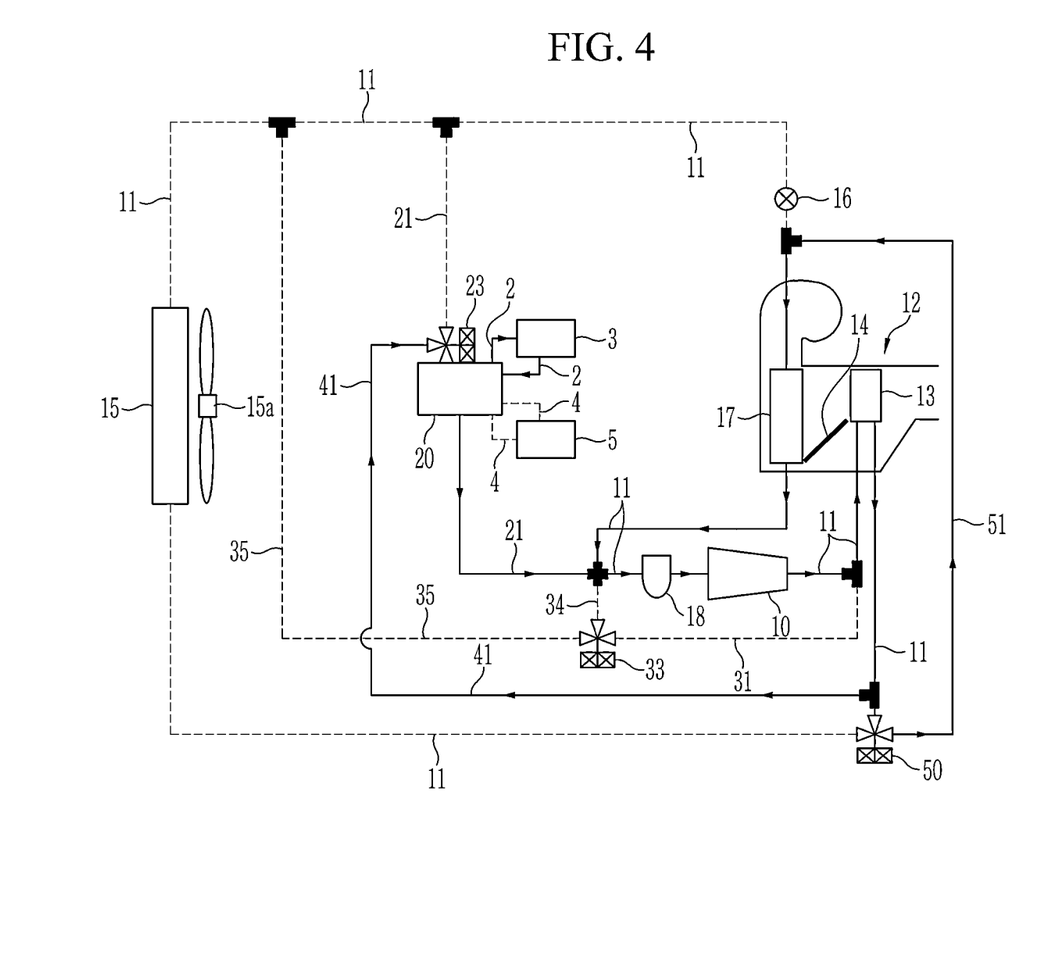
FIG. 4 is an operation diagram illustrating a heat pump system for a vehicle according to an embodiment, in a heating and dehumidifying mode of the vehicle interior.

FIG. 4 is an operation diagram with respect to the heating and dehumidifying mode of the vehicle interior in a heat pump system for a vehicle according to an embodiment.

Referring to FIG. 4, in the case of the heating and dehumidifying mode of the vehicle interior, the refrigerant line 11 connecting the heat-exchanger 15 and the first expansion valve 16 may be closed by the operation of the first expansion valve 16.

Simultaneously, the refrigerant line 11 connecting the heat-exchanger 15 and the fourth expansion valve 50 may be closed by the operation of the fourth expansion valve 50.

In addition, the refrigerant line 11 connecting the evaporator 17 and the compressor 10, and the refrigerant line 11 connecting the second end of the sixth connection line 51 and the evaporator 17 such that the sixth connection line 51 is connected to the evaporator 17 through the refrigerant line 11 may be opened.

A portion of the first connection line 21 connecting the second expansion valve 23 and the refrigerant line 11 between the heat-exchanger 15 and the first expansion valve 16 may be closed.

In addition, a partial first connection line 21 connecting the refrigerant line 11 between the evaporator 17 and the compressor 10 and the chiller 20 may be opened.

The second connection line 31, the third connection line 34, and the fourth connection line 35 may be closed by the operation of the third expansion valve 33.

In the present embodiment, the fifth connection line 41 may be opened by the operation of the second expansion valve 23. The second expansion valve 23 may expand the refrigerant introduced through the fifth connection line 41 and supply the expanded refrigerant to the chiller 20.

In addition, the sixth connection line 51 may be opened by the operation of the fourth expansion valve 50.

The fourth expansion valve 50 may expand the refrigerant introduced through the refrigerant line 11, and may flow the expanded refrigerant to the sixth connection line 51.

In such a state, when the compressor 10 is operated for heating of the vehicle interior, the refrigerant discharged from the compressor 10 may flow into the internal condenser 13 along the refrigerant line 11.

The refrigerant discharged from the internal condenser 13 may flow along the refrigerant line 11. A partial refrigerant among the refrigerant flowing along the refrigerant line 11 may flow into the second expansion valve 23 along the opened fifth connection line 41.

The second expansion valve 23 may expand the refrigerant introduced through the fifth connection line 41 and supply the expanded refrigerant to the chiller 20.

The coolant may circulate through the first line 2 by an operation of a water pump (not shown). Accordingly, the coolant having passed through the electrical component 3 may be supplied to the chiller 20 along the first line 2.

In other words, the coolant having an increased temperature by absorbing the waste heat from the electrical component 3 may be supplied to the chiller 20 through the coolant line 2.

The chiller 20 may evaporate the expanded refrigerant by exchanging heat with the coolant supplied through the first line 2. The chiller 20 may recollect the waste heat of the electrical component 3 from the coolant heated by recollecting waste heat from the electrical component 3.

A remaining refrigerant among the refrigerant flowing along the refrigerant line 11 may flow into the fourth expansion valve 50.

The fourth expansion valve 50 may expand the refrigerant introduced through the refrigerant line 11, and may flow the expanded refrigerant to the sixth connection line 51. The refrigerant introduced into the sixth connection line 51 may pass through the evaporator 17 along the refrigerant line 11 connected to the sixth connection line 51.

Then, the refrigerant having passed through the evaporator 17 may flow to the accumulator 18 together with the refrigerant flowing from the chiller 20 along the first connection line 21.

In addition, the refrigerant having passed through the accumulator 18 may repeatedly perform the above-described processes while being supplied to the compressor 10.

The opening/closing door 14 may open a portion passing through the internal condenser 13 such that the ambient air introduced into the HVAC module 12 may pass through the evaporator 17 and then flow into the internal condenser 13.

Accordingly, the ambient air that is dehumidified while passing through the evaporator 17 is converted to a high-temperature state while passing through the internal condenser 13. Then the ambient air is introduced into the vehicle interior, and thus the vehicle interior may be heated and dehumidified.

In other words, the ambient air introduced into the HVAC module 12 may be dehumidified by the low-temperature refrigerant introduced into the evaporator 17 while passing through the evaporator 17. Thereafter, since the air is converted to a high-temperature state while passing through the internal condenser 13 and then introduced into the vehicle interior, the vehicle interior may be smoothly heated and dehumidified.

In addition, the operation for cooling the battery module 5 in the cooling mode of the vehicle interior is described with reference to FIG. 5.

Figure 5:
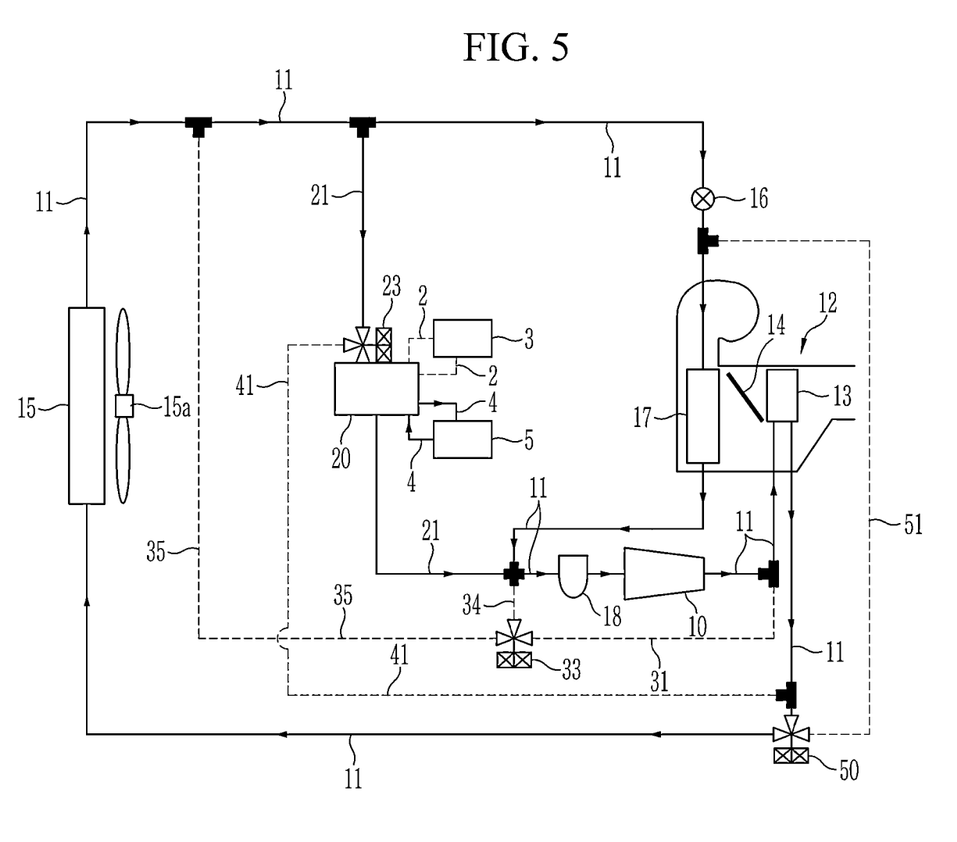
FIG. 5 is an operation diagram illustrating a heat pump system for a vehicle according to an embodiment, for cooling a battery module in a cooling mode of the vehicle interior.

FIG. 5 is an operation diagram illustrating a heat pump system for a vehicle according to an embodiment, for cooling a battery module in a cooling mode of the vehicle interior.

Referring to FIG. 5, in the case of cooling the battery module in the cooling mode of the vehicle interior, the coolant may circulate through the second line 4 by an operation of a water pump (not shown). In other words, the coolant having passed through the battery module 5 may be supplied to the chiller 20 along the second line 4.

The refrigerant line 11 may be opened by the operation of the first expansion valve 16 and the fourth expansion valve 50, so as to form one closed circuit in which the refrigerant circulates. The first expansion valve 16 may expand the refrigerant introduced through the refrigerant line 11.

In addition, the first connection line 21 may be opened by the operation of the second expansion valve 23 for cooling of the battery module 5.

Accordingly, the coolant having passed through the battery module 5 may be supplied to the chiller 20 along the second line 4.

The second expansion valve 23 may expand the refrigerant introduced into the first connection line 21 and flow the expanded refrigerant to the chiller 20 so as to cool the battery module 5 by using the coolant having exchanged heat with the refrigerant in the chiller 20.

Therefore, the coolant having passed through the chiller 20 may be cooled by exchanging heat with the expanded refrigerant supplied to the chiller 20.

In other words, the coolant passing through the chiller 20 may be cooled through heat-exchange with the expanded refrigerant supplied to the chiller 20. The coolant cooled in the chiller 20 may be supplied to the battery module 5 along the second line 4. Accordingly, the battery module 5 may be efficiently cooled by the coolant cooled at the chiller 20.

In the present embodiment, the second connection line 31, the third connection line 34, and the fourth connection line 35 may be closed by the operation of the third expansion valve 33. In addition, the fifth connection line 41 may be closed by the operation of the second expansion valve 23.

In addition, the sixth connection line 51 may be closed by the operation of the fourth expansion valve 50. The fourth expansion valve 50 may flow the refrigerant introduced from the internal condenser 13 through the refrigerant line 11 to the refrigerant line 11 without expansion.

In such a state, when the compressor 10 is operated for cooling of the vehicle interior, the refrigerant discharged from the compressor 10 may flow into the internal condenser 13 along the refrigerant line 11.

The refrigerant discharged from the internal condenser 13 may flow to the fourth expansion valve 50 along the refrigerant line 11. Thereafter, the refrigerant having passed through the fourth expansion valve 50 may flow into the heat-exchanger 15.

The heat-exchanger 15 may condense the refrigerant by using the ambient air introduced from the outside.

The refrigerant discharged from the heat-exchanger 15 may flow along the refrigerant line 11. A partial refrigerant among the refrigerant discharged from the heat-exchanger 15 may flow into the chiller 20 along the first connection line 21.

The refrigerant introduced into the chiller 20 may exchange heat with the coolant supplied through the second line 4, may pass through the accumulator 18 through the refrigerant line 11 connected to the first connection line 21, and then may be introduced into the compressor 10.

A remaining refrigerant among the refrigerant discharged from the heat-exchanger 15 may flow into the first expansion valve 16 along the refrigerant line 11 so as to cool the vehicle interior.

The first expansion valve 16 may expand the refrigerant introduced through the refrigerant line 11 and flow the expanded refrigerant to the evaporator 17.

The refrigerant having passed through the evaporator 17 may sequentially pass through the accumulator 18 and the compressor 10 along the refrigerant line 11.

In other words, the refrigerant discharged from the chiller 20 and the refrigerant discharged from the evaporator 17 may pass through the accumulator 18 along the refrigerant line 11, and then may be supplied to the compressor 10.

The air introduced into the HVAC module 12 may be cooled by the low-temperature refrigerant introduced into the evaporator 17 while passing through the evaporator 17.

The opening/closing door 14 may close a portion passing toward the internal condenser 13 such that the cooled ambient air may not pass through the internal condenser 13. Therefore, the cooled ambient air may cool the vehicle interior, by being directly drawn to the vehicle interior.

As described above, according to a heat pump system for a vehicle according to an embodiment, in a state that the external temperature is low and the heat generated from a heating element such as the electrical component 3 and the battery module 5 is not sufficient in the early stage of driving the vehicle, the heating of the vehicle interior may be efficiently performed.

In addition, according to the present disclosure, in the general heating mode of the vehicle interior, by increasing the flow of the refrigerant by utilizing various heat sources at the same time, and disposing the heat-exchanger 15 and the chiller 20 in parallel, the system performance may be maximized.

In addition, according to the present disclosure, since heating of the vehicle interior may be performed by using the high-temperature refrigerant compressed in the compressor 10 while minimizing the required number of components, an electric heater may not be employed, and streamlining and simplification of the entire system may be achieved.

In addition, according to the present disclosure, when the electric heater is employed, since the usage of the electric heater may be minimized, electricity consumption may be reduced, and an overall travel distance of the vehicle may be increased.

In addition, according to an embodiment, it is possible to reduce manufacturing cost and weight through simplification of an entire system, and to improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS 2, 4: first and second lines
3: electrical component
4: battery module
10: compressor
11: refrigerant line
12: HVAC module
13: internal condenser
14: opening/closing door
15: heat-exchanger
15a: cooling fan
16: first expansion valve
17: evaporator
18: accumulator
20: chiller
21: first connection line
23: second expansion valve
31: second connection line
33: third expansion valve
34: third connection line
35: fourth connection line
41: fifth connection line
50: fourth expansion valve
51: sixth connection line

What is claimed is:

1. A heat pump system for a vehicle, comprising:
a compressor configured to compress a refrigerant circulating the heat pump system;
a heat, ventilation, and air condition (HVAC) module including an internal condenser, an evaporator connected to the compressor via a refrigerant line, and an opening/closing door configured to adjust air having passed through the evaporator to be selectively introduced into the internal condenser based on a cooling mode or a heating mode of the vehicle;
a heat-exchanger connected to the internal condenser via the refrigerant line;
a first expansion valve provided in the refrigerant line between the heat-exchanger and the evaporator;
a first connection line including: a first end connected to the refrigerant line between the heat-exchanger and the first expansion valve, and a second end connected to the refrigerant line between the evaporator and the compressor;

a chiller provided in the first connection line, and configured to adjust a temperature of a coolant by exchanging heat between the refrigerant introduced into the first connection line with a selectively introduced coolant;

a second expansion valve provided in the first connection line upstream of the chiller;

a second connection line including: a first end connected to the refrigerant line between the compressor and the internal condenser, and a second end connected to a third expansion valve;

a third connection line including: a first end connected to the third expansion valve, and a second end connected to the refrigerant line between the chiller the compressor; and a fourth connection line including: a first end connected to the third expansion valve, and a second end connected to the refrigerant line between the heat-exchanger and the first expansion valve.

2. The heat pump system of claim 1, further comprising:

a fourth expansion valve provided in the refrigerant line between the internal condenser and the heat-exchanger;

a fifth connection line including: a first end connected to the refrigerant line between the internal condenser and the fourth expansion valve, and a second end connected to the second expansion valve; and a sixth connection line including: a first end connected to the fourth expansion valve, and a second end connected to the refrigerant line between the first expansion valve and the evaporator.

3. The heat pump system of claim 2, wherein, in a hot gas heating mode of a vehicle interior:

the refrigerant line connecting the heat-exchanger and the first expansion valve, the refrigerant line connecting the first expansion valve and the evaporator, and the refrigerant line connecting the evaporator and the compressor are closed by an operation of the first expansion valve;

the refrigerant line connecting the heat-exchanger and the fourth expansion valve is closed by an operation of the fourth expansion valve;

a partial first connection line connecting the refrigerant line between the heat-exchanger and the first expansion valve and the second expansion valve is closed;

a partial first connection line connecting the refrigerant line between the evaporator and the compressor and the chiller is opened;

the second connection line and the third connection line are opened by an operation of the third expansion valve;

the fourth connection line is closed by the operation of the third expansion valve;

the fifth connection line is opened by an operation of the second expansion valve; and the sixth connection line is closed by the operation of the fourth expansion valve.

4. The heat pump system of claim 3, wherein the second expansion valve is configured to expand the refrigerant introduced via the fifth connection line and supply the expanded refrigerant to the chiller.

5. The heat pump system of claim 3, wherein the third expansion valve is configured to expand the refrigerant introduced via the second connection line, and flow the expanded refrigerant to the third connection line.

6. The heat pump system of claim 2, wherein, in the heating mode of a vehicle interior:

the refrigerant line connecting the first expansion valve and the evaporator, and the refrigerant line connecting the evaporator and the compressor are closed by an operation of the first expansion valve;

the refrigerant line connecting the heat-exchanger and the fourth connection line is opened;

the refrigerant line connecting the heat-exchanger and the fourth expansion valve is opened by an operation of the fourth expansion valve;

a partial first connection line connecting the refrigerant line between the heat-exchanger and the first expansion valve and the second expansion valve is closed;

a partial first connection line connecting the refrigerant line between the evaporator and the compressor and the chiller is opened;

the second connection line is closed by an operation of the third expansion valve;

the third connection line and the fourth connection line are opened by the operation of the third expansion valve;

the fifth connection line is opened by an operation of the second expansion valve;

the sixth connection line is closed by the operation of the fourth expansion valve; and the fourth expansion valve expands the refrigerant introduced via the refrigerant line, and flows the expanded refrigerant into the heat-exchanger.

7. The heat pump system of claim 6, wherein the heat-exchanger is configured to recollect ambient air heat while evaporating the refrigerant supplied from the fourth expansion valve by exchanging heat with the ambient air.

8. The heat pump system of claim 6, wherein the second expansion valve is configured to expand the refrigerant introduced via the fifth connection line and supply the expanded refrigerant to the chiller.

9. The heat pump system of claim 6, wherein the third expansion valve is configured to flow the refrigerant introduced via the fourth connection line to the third connection line without expansion.

10. The heat pump system of claim 2, wherein, in a heating and dehumidifying mode of a vehicle interior:

the refrigerant line connecting the heat-exchanger and the first expansion valve is closed by an operation of the first expansion valve;

the refrigerant line connecting the heat-exchanger and the fourth expansion valve is closed by an operation of the fourth expansion valve;

the refrigerant line connecting the evaporator and the compressor, and the refrigerant line connecting the second end of the sixth connection line and the evaporator such that the sixth connection line is connected to the evaporator via the refrigerant line are opened;

a partial first connection line connecting the refrigerant line between the heat-exchanger and the first expansion valve and the second expansion valve is closed;

a partial first connection line connecting the refrigerant line between the evaporator and the compressor and the chiller is opened;

the second connection line, the third connection line, and the fourth connection line are closed by an operation of the third expansion valve;

the fifth connection line is opened by an operation of the second expansion valve; and the sixth connection line is opened by the operation of the fourth expansion valve.

11. The heat pump system of claim 10, wherein the second expansion valve is configured to expand the refrigerant introduced via the fifth connection line and supply the expanded refrigerant to the chiller.

12. The heat pump system of claim 10, wherein the fourth expansion valve is configured to expand the refrigerant introduced via the refrigerant line, and flow the expanded refrigerant to the sixth connection line.

13. The heat pump system of claim 2, wherein, when cooling a battery module in the cooling mode of a vehicle interior:
- the refrigerant line is opened by an operation of the first expansion valve and the fourth expansion valve, so as to form one closed circuit in which the refrigerant circulates;
- the first connection line is opened by an operation of the second expansion valve;
- the second connection line, the third connection line, and the fourth connection line are closed by an operation of the third expansion valve;
- the fifth connection line is closed by the operation of the second expansion valve; and
- the sixth connection line is closed by the operation of the fourth expansion valve.

14. The heat pump system of claim 13, wherein:
- the first expansion valve is configured to expand the refrigerant introduced via the refrigerant line;
- the second expansion valve is configured to expand the refrigerant introduced via the first connection line; and
- the fourth expansion valve is configured to flow the refrigerant introduced from the internal condenser via the refrigerant line to the refrigerant line without expansion.

15. The heat pump system of claim 2, wherein the heat-exchanger is further configured to condense or evaporate the refrigerant condensed at the internal condenser by exchanging heat with ambient air, according to a selective operation of the fourth expansion valve.

16. The heat pump system of claim 2, wherein the second expansion valve, the third expansion valve, and the fourth expansion valve are electronic expansion valves configured to selectively expand the refrigerant while controlling a flow of the refrigerant.

17. The heat pump system of claim 2, wherein a second end of the fourth connection line is connected to the refrigerant line between the heat-exchanger and a location where a first end of the first connection line is connected to the refrigerant line.

18. The heat pump system of claim 1, wherein the chiller is disposed in parallel with the heat-exchanger via the first connection line.

19. The heat pump system of claim 1, further comprising an accumulator provided in the refrigerant line between the evaporator and the compressor.

20. The heat pump system of claim 1, wherein the chiller is connected between an electrical component and a battery module via a first line and a second line, and wherein the first line and second line each circulate the coolant.

* * * * *